United States Patent [19]
Pitzer

[11] 3,709,088
[45] Jan. 9, 1973

[54] QUICK ACTING, HIGH TENSILE, BLIND FASTENER

[75] Inventor: Kenneth H. Pitzer, Los Angeles, Calif.

[73] Assignee: Adjustable Bushing Corporation, Hollywood, Calif.

[22] Filed: Dec. 14, 1970

[21] Appl. No.: 98,054

Related U.S. Application Data

[63] Continuation-in-part of Ser. No. 808,779, March 20, 1969, abandoned.

[52] U.S. Cl. ................................................. 85/74
[51] Int. Cl. ......................................... F16b 13/06
[58] Field of Search ........................... 85/74, 32 W

[56] References Cited

UNITED STATES PATENTS

| | | | |
|---|---|---|---|
| 1,031,462 | 7/1912 | Paine | 85/73 |
| 2,408,560 | 10/1946 | Keehn | 85/5 E |
| 3,192,820 | 7/1965 | Pitzer | 85/69 |

*Primary Examiner*—Edward C. Allen
*Attorney*—Parker & Hale Christie

[57] ABSTRACT

Rotation of a cam brings a first cam surface to bear on the driving side of a sheet and forces the head of a drawbolt to expand the fingers of an expansible sleeve radially outward for subsequent engagement of the blind side of another sheet. Continued rotation of the cam brings a second cam surface into engagement with the driving side of the sheet to draw the expanded sleeve against the blind side, clamp the sheets together, and form a joint.

4 Claims, 3 Drawing Figures

PATENTED JAN 9 1973

3,709,088

INVENTOR.
KENNETH H. PITZER

BY
Christie, Parker, & Hale
ATTORNEYS

QUICK ACTING, HIGH TENSILE, BLIND FASTENER

CROSS-REFERENCE TO RELATED APPLICATIONS

This is a continuation-in-part application of application Ser. No. 808,779 filed Mar. 20, 1969 and now abandoned.

BACKGROUND OF THE INVENTION

The present invention relates to fasteners in general, and, more in particular, to a cam actuated blind fastener which effects blind side expansion of a sleeve followed by the drawing of the expanded sleeve against the blind side of a pair of objects being clamped together.

There is a requirement for fast acting fasteners or clamps for securing objects such as sheets together, or for securing the fastener to one or more objects for the purpose of constituting the fastener as a handle, for example. The requirement embraces fast acting fasteners which can be removed from the objects without destroying the objects or the fastener.

An example of a fast acting fastener of this type is described in U.S. Pat. No. 3,192,820.

In many applications it is necessary that the fastener be able to sustain a considerable tensile load. This means that the tensile load bearing member must have a considerable cross-sectional area. To effectively transmit large tensile loads to fastened objects without damaging them, it is often necessary to provide a considerable amount of blind side expansion to ensure a large bearing area between the expanded element of the fastener and the engaged object.

SUMMARY OF THE INVENTION

The present invention provides a cam actuated, quick acting, high tensile blind fastener which effects the expansion of an expansible sleeve followed by the drawing of the sleeve against the blind side of one or more objects to be fastened.

In specific form, the invention provides a drawbolt having a head at one of its ends for engagement by a first sleeve on a blind side of one or more objects to be fastened together. This first sleeve has a plurality of longitudinally disposed, circumferentially spaced apart, radially expansible, resilient elements. Each of these expansible resilient elements has a free end disposed at the end of the sleeve remote from the head for facing the blind side of the objects. The expansible elements extend from their free ends to a terminus spaced from the head defined by, for example, a collar-like portion of the sleeve. A second sleeve is received by the drawbolt and has a conical end for engaging the free ends of the resilient elements of the first sleeve for expanding these elements radially. A cam lever is rotatably mounted to the drawbolt at the end thereof opposite the drawbolt's head. The cam lever has a first cam surface engageable only with the second sleeve and which has a rise for displacing the second sleeve with respect to the first sleeve to expand the first sleeve's resilient elements. The cam lever has a second cam surface which bears on the object to be fastened to exert a compressive force and cause the drawbolt and expanded first sleeve to move towards the blind side of the objects and clamp them together after the resilient elements have been expanded by the second sleeve.

Preferably, the fastener has a washer disposed concentrically about the second sleeve for engagement by the second cam surface and bearing against the first object to be fastened.

It is also preferred to form the cam lever such that it straddles the drawbolt, that is, to have the cam lever bifurcated. The drawbolt is carried between the bifurcations and the first and second cam surfaces are disposed on each of the bifurcations. For adjustment purposes it is preferred that the drawbolt be carried by a threaded connection in a pivot pin disposed between the bifurcations.

These and other features, aspects and advantages of the present invention will become more apparent from the following description, appended claims and drawings.

DESCRIPTION OF THE PREFERRED EMBODIMENT

Figure 3:
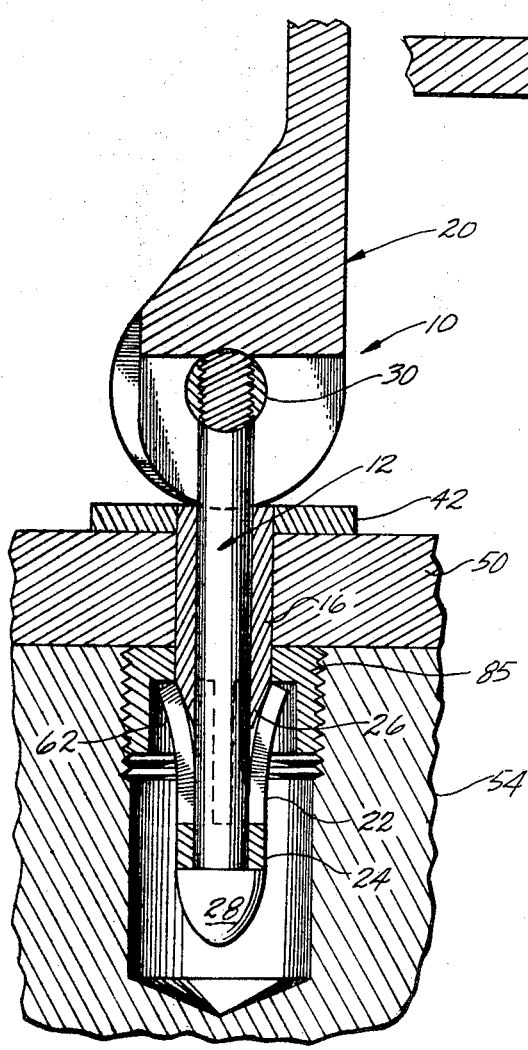
FIG. 3 is a view similar to FIG. 2 showing the fastener in a set condition.
Figure 2:
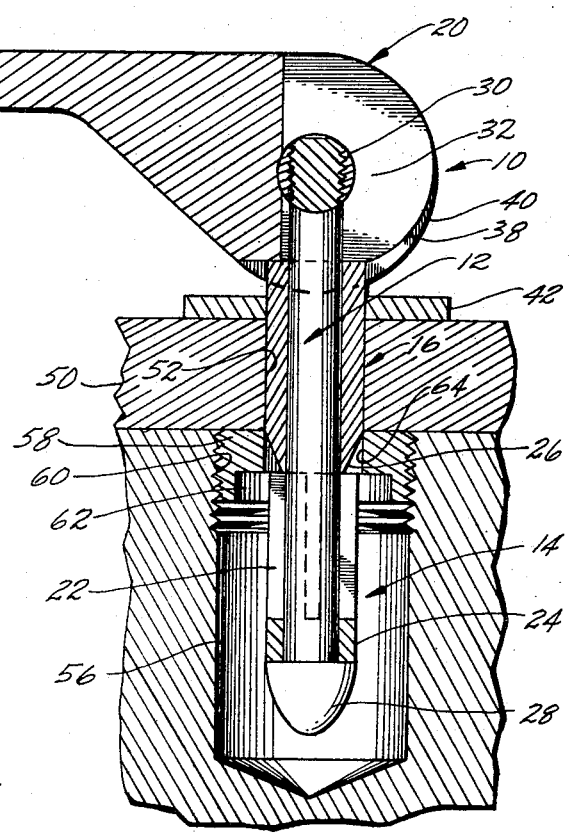
FIG. 2 is a side elevational view, partly in section, showing the fastener of FIG. 1 prior to its expansion to hold together a pair of sheets or objects; the section is taken in the plane of line 2—2 of FIG. 1.

With reference to the Figures, the quick acting, high tensile, blind fastener is indicated in general by reference numeral 10. In FIGS. 2 and 3 the fastener is shown in an environment for clamping two objects together. The fastener is hand actuatable and is of the type which expands a sleeve on the blind side of a pair of sheets or in a blind hole against a shoulder, the latter being shown in the Figures.

In general, the fastener includes a drawbolt 12, a first sleeve 14, a second sleeve 16, and a cam lever 20.

The first sleeve is expansible by the second sleeve. For this purpose, the first sleeve has a plurality of longitudinally extending, finger-like resilient elements 22 connected together at the base of the sleeve by ring-like collar 24. Viewed in another light, sleeve 14 may be formed of a piece of elastically deformable tubing merely by producing longitudinal, regularly circumferentially spaced slits in the wall of the tubing.

Second sleeve 16 has a conical nose 26 for engaging and expanding the fingers of sleeve 14. In assembly, sleeve 16 is disposed between cam lever 20 and sleeve 14. Drawbolt 12 receives both sleeves.

Drawbolt 12 has a head 28 for engaging collar 24 of sleeve 14 and for forcing elements 22 over the conical nose of sleeve 16. The end of the drawbolt opposite its head is threaded at 30 for threaded receipt in a cross pivot pin 32 which for its part is secured in cam lever 20. This threaded receipt provides adjustment of the effective grip length of the fastener.

Figure 1:
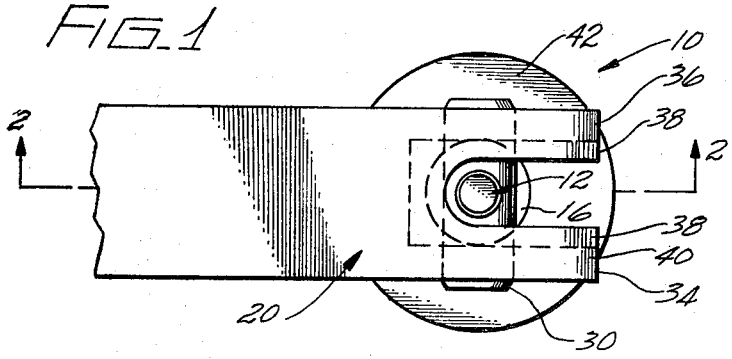
FIG. 1 is a top plan view of a preferred embodiment of the quick acting, high tensile blind fastener of the present invention.

Cam lever 20 is bifurcated to straddle drawbolt 12. The bifurcated sections are indicated by reference numerals 34 and 36. Each of the bifurcated sections has a pair of cam surfaces indicated by reference numerals 38 and 40. The inner of these cam surfaces 38 are disposed for engaging only sleeve 16, as is clearly shown in FIG. 1. The second of the cam surfaces is disposed to straddle sleeve 16 and engage a bearing washer 42. The rise of cam surfaces 38 is such that they fair into cam surfaces 40 after expansion of the resilient elements of sleeve 14. With continued rotation of the cam after the elements of sleeve 14 have been expanded, the objects to be clamped together are drawn together because of the compressive bearing exerted on the objects by the expanded sleeve and the washer.

During rotation of cam lever 20, while first cam surfaces 38 are acting on sleeve 16, outer or second surfaces 40 do not act on bearing washer 42. The cam surfaces are such, in short, that the initial action is to expand elements 22 by forcing sleeve 16 against them, without having cam surfaces 40 act on washer 42 in any manner which would produce any clamp-up force on the objects to be joined. That is, during the initial stages of clamp-up, outer cam surfaces 40 do not act on the workpieces and, as such, outer cam surfaces 40 are preferably concentric to the axis of pivot pin 32. After the expansion of resilient elements 20 by the action of inner cam surfaces 38 on sleeve 16, surfaces 40 act through washer 42 on the objects to be clamped to draw the expanded sleeve 22 firmly against the objects to produce their clamp-up. After expansion of the elements, outer cam surfaces 40 are eccentric to the axis of pivot pin 32 to effect the desired movement of the head of the drawbolt and expanded sleeve against the blind side of the objects being fastened. In terms of the Figures, the action of cam surfaces 40 on the objects to be fastened in progressing from the FIG. 2 to FIG. 3 orientation is nil until resilient elements 22 are expanded Another way of viewing the action of the two pairs of cooperating cam surfaces is this. Beginning in FIG. 2, it is seen that cam surfaces 38 engage the top of sleeve 16, which extends slightly above washer 42. With rotation of the cam handle clockwise, the rise of surfaces 38 is such that the distance between these cam surfaces and head 28 of the drawbolt is progressively shortened. The shortening of this distance results in the driving of sleeve 16 towards the head of the drawbolt. With this movement of sleeve 16, resilient elements 22 are expanded. After the resilient elements of sleeve 14 are expanded, cam surfaces 38 merge into cam surfaces 40. But the rise of outer cam surfaces 40 is such that with continued clockwise rotation the objects are drawn together.

With particular reference to the objects illustrated in the drawings, an upper sheet 50 has a hole 52 which receives sleeve 16. A lower sheet 54 has a blind hole 56 which receives a bushing 58, as by threads 60. The bushing has a counterbore 62 admitting to the expansion of the resilient elements against its base. This counterbore opens into a bore 64 of the bushing. To clamp the objects together, blind fastener 10 is inserted into hole 52 in sheet 50 and bore 64 of bushing 58 to achieve the condition illustrated in FIG. 2. In this Figure, it will be noted that resilient fingers 22 are not expanded and that sleeve 16 extends slightly above the upper surface of washer 42. With clockwise rotation of cam handle 20, cam surfaces 38 will force sleeve 16 to expand the fingers of sleeve 14 radially outward into counterbore 62. Ultimately cam surfaces 40 will bear directly on washer 42 while cam surfaces 38 merely maintain a bearing on the end of sleeve 16, as is illustrated in FIG. 3. With continued rotation of the cam handle clockwise, the rise of cam surfaces 40 is such that the head of drawbolt 12 and its carried resilient elements 22 will be drawn towards the setting side of the sheets. That is, the expanded sleeve elements will be drawn tightly against the annular shoulder defined by counterbore 62 to pull sheet 54 and its bushing 58 into compressive engagement with sheet 50.

Thus the present invention provides a quick acting, blind fastener which ensures full expansion of its resilient expansion element on the blind side of the pair of sheets to be clamped together or in a blind hole against a shoulder. After the expansion has been effected, the expanded sleeve is drawn towards the rotating cam to firmly clamp the objects or members together. The construction of the present invention provides a quick acting fastener which is capable of sustaining considerable tensile force by virtue of the large amount of compressive bearing area available between the free but expanded ends of the fingers and the sheets being held together. Moreover, the joint effected by the fastener of the present invention can be broken down without destroying the objects or the fastener itself.

What is claimed is:

1. A quick acting, readily removable, blind fastener for fastening a first and second object together comprising:
   a. a drawbolt having a head at a first end thereof;
   b. a first sleeve received by the drawbolt for longitudinal engagement by the head, the sleeve having a plurality of longitudinally disposed, circumferentially spaced, radially expansible, resilient elements, each element having a free end disposed at the end of the sleeve remote from the head, the elements extending from their free ends to a terminus spaced from the head;
   c. a second sleeve received by the drawbolt having a conical end for engaging the free ends of the resilient elements and expanding them radially; and
   d. a cam lever rotatably carried by the drawbolt at the second end thereof, the cam lever having a first cam surface engageable with the second sleeve exclusive of the objects, the first cam surface having a rise such that with rotation of the cam lever in a predetermined direction from a predetermined initial position the second sleeve is engaged by the first cam surface and moved toward the drawbolt head to cause the second sleeve to engage and expand the resilient elements behind the second object and, after such expansion with continued rotation of the cam lever in the same direction, to maintain the elements expanded, the cam lever having a second cam surface engageable with the first object to be fastened without engaging the second sleeve, the second cam surface having a rise such that with rotation of the cam lever in the predetermined direction after expansion of the elements the second cam surface acts on the first object to cause the drawbolt and expanded first sleeve to move towards the first object and clamp the first and second objects together.

2. The quick acting fastener claimed in claim 1 including a washer disposed concentrically around the second sleeve for engagement by the second cam surface and for bearing against the first object.

3. The quick acting fastener claimed in claim 2 wherein the cam lever is bifurcated with the drawbolt being carried between the bifurcations, the first and second cam surfaces being disposed on each of the bifurcations.

4. The quick acting fastener claimed in claim 3 wherein the drawbolt is carried by a threaded connection in a pivot disposed between the bifurcations.

* * * * *